Oct. 26, 1948.　　　　　F. E. FLOTRON　　　　　2,452,363
NOVELTY OPTICAL DEVICE
Filed Feb. 20, 1947
FIG.1.
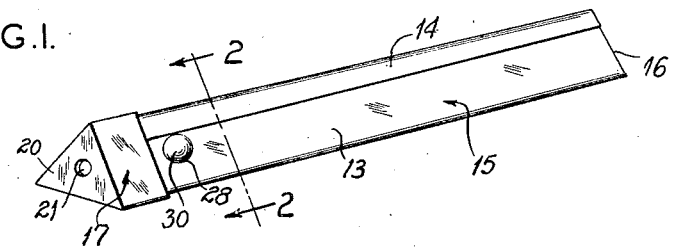
FIG.2.
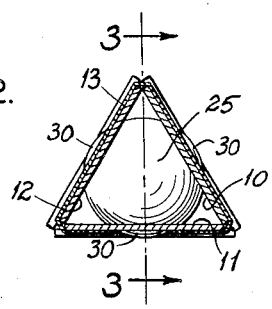
FIG.3.
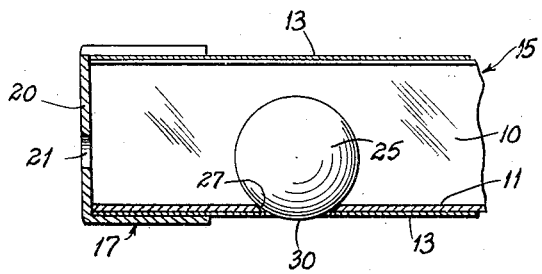
FIG.4.　　　　　　　　　　　　　　　　　　FIG.5.
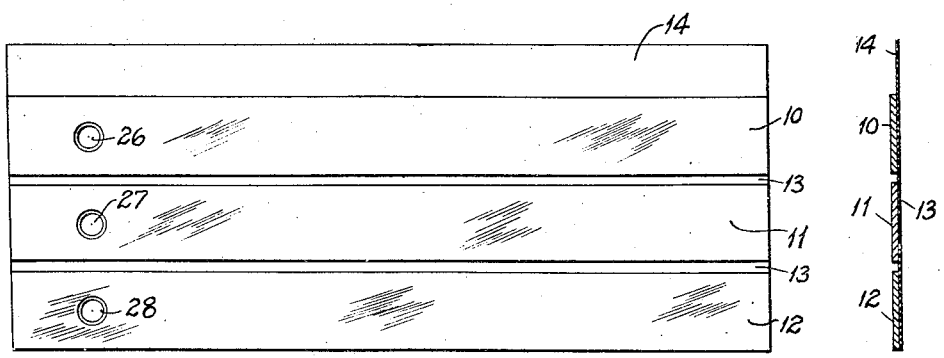
FIG.6.
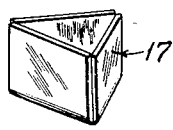
INVENTOR;
FRANK EARL FLOTRON
BY
ATTORNEY Patented Oct. 26, 1948

2,452,363

UNITED STATES PATENT OFFICE 2,452,363

NOVELTY OPTICAL DEVICE

Frank Earl Flotron, St. Louis, Mo.

Application February 20, 1947, Serial No. 729,719

2 Claims. (Cl. 88—15)

This invention relates to improvements in novelty optical devices, and more particularly to an improved device for producing a pattern of juxtaposed reflected images, from a variety of target material viewed through and with the aid of the device, so as to produce an optical effect somewhat similar, yet in many ways superior to the effects attained by certain kaleidoscopic articles.

There are prevalently offered to the trade, particularly for juvenile amusement purposes, kaleidoscopes of a type employing a tube, in one end of which is a compartment or compartments containing a plurality of particles, usually colored, and subject to movement upon rotation of the tube to produce some variety, although a limited one, of different colored images. The present device has as an objective or purpose, the production of a tubular optical device for a comparable purpose, yet one which can be produced at a much lower cost than those above described, and which is unlimited in the possible number and types of patterns and effects realized thereby.

Another important object of the invention is the production of a device of a generally kaleidoscopic nature, which may be produced at a low cost, without any expensive tooling equipment, which is not easily broken, presents virtually no hazards in the hands of children, and in which the light reflecting and transmitting elements are or may be of unbreakable character.

Yet another object of the invention is attained in a device adapted to produce kaleidoscopic effects, and yet which is or may be made without moving parts.

Still further objectives and advantages of the improvements include a device of the general nature mentioned, which is light in weight, easily packaged, non-rusting or corroding, and which may be used with any selected target or image material, and with either natural or artificial light.

The foregoing and other objectives and advantages of the invention will more clearly appear from the following detailed description of a preferred embodiment thereof, particularly when considered in connection with the accompanying drawing, in which:

Fig. 1 is an elevation in perspective of a device constructed to embody the present improvements;

Fig. 2 is a somewhat enlarged transverse sectional view as taken along line 2—2 of Fig. 1;

Fig. 3 is a fragmentary section, taken through one end portion of the device, specifically along line 3—3 of Fig. 2;

Fig. 4 is a plan view showing an arrangement of reflecting strips as same would appear in the course of forming up a tubular body of the device, and before assembly of the elements into tubular form;

Fig. 5 is a sectional view through the assembly of Fig. 4, and

Fig. 6 is an elevation in perspective, of a cap element preferably employed as a partial closure for one end of the tubular body.

Referring now by characters of reference to the drawing, a preferred embodiment of the device includes a tubular body 15 formed up to include a plurality of internally reflective planar surfaces, this body being provided at one or its objective end with a light-receiving opening and at its opposite or eye piece end, with a light-transmitting opening, as will later appear. Although it is possible to construct such a tubular body for the present purpose, say of a single element or an assembly of elements of a reflective coated or plastic material, or of a series of strip mirrors of glass or the like, it is preferred in the interest of safety against breakage hazards and low cost, to form the body of a series, shown as three, of planar aluminum sheet or strip elements 10, 11 and 12. A preferred manner of assembly is to utilize three strips of uniform width, and of a moderate length, those heretofore made for the trade having been formed in lengths of six inches, noted here by way of example only and without dimensional restriction. The three strips are disposed in spaced parallel planar relation as shown by Fig. 4, and are laid up in the manner illustrated on a sheet or strip backing element 13. This latter is by preference for economy, a sheet of adhesive Cellophane tape, one side of which is provided with a self-cementing, tightly adhering adhesive. The backing sheet or strip 13 is provided in a width somewhat exceeding the combined width of the assembly of spaced strips 10, so as to result in an overlapping binding or edge portion 14.

A plurality of three or more of the strips 10, 11, 12 after having been initially assembled to the backing 13, are then brought into mutually angular relation, preferably but not necessarily, such as to present in case three such reflecting strips be employed, a tubular structure, the transverse section of which is in the nature of an equilateral triangle. The sectional arrangement is exemplified by the section of Fig. 2. It is of course entirely possible to substitute for the single backing sheet of adhesive coated material, one or a plurality of relatively narrow strips say of the same material, which in the assembly, constitute one or more servings say of so-called "Scotch" tape which generally embrace the assembly of strips and operate to maintain them in tubular form and in fixed angular relation to each other. The spacing between the three reflective strips 10, 11 and 12 is such that in assembly, their reflective surfaces are brought into contiguity as appears in Fig. 2, and preferably, but not necessarily, without much or any edge overlap of the three planar elements which, as will now be seen, are arranged virtually in edge to edge relation.

The tube as thus far assembled is useful and operative when held a slight distance above some ornamental or pictorial surface, preferably colored to produce a plurality of images of the so-called target material. For this purpose the target design is subjected to a reasonable intensity of natural or artificial light, and the angular position of the tubular body generally indicated at 15, is so selected as to obtain a requisite illumination therethrough. The images resulting from the series of reflections will be projected upwardly through the eye piece end of the tube.

It is a preference to leave fully open and unrestricted, the light-receiving end 16 of the tube 15. It has been found conducive to a better effect and partly to eliminate stray light from entering the eyepiece end of the tubular body structure, to provide thereon, in telescopic relation, a frictionally retained cap structure 17. This latter is constructed to provide the same number of planar sides as characterizes the tube, and an end closure 20 provided with a circular light-transmitting opening 21 through which the multiple images may be viewed. It is preferred that the cap 17 be applied externally, altthough if desired, it may be telescopically fitted internally of the eyepiece end of the body.

As thus far described, the device is characterized by a lack of moving elements, i. e., any internal parts which receive motion relative to the body. It is valuable and produces many interesting and novel reflected light patterns, when employed in static position, it being noted that colors, designs and shaping of the target material may be selected in endless and infinite variety to suit individual tastes. The manifold optical effects attainable are still further multiplied by rotation of the tube about its own axis, when held in viewing position.

A further optical adjunctive arrangement, consists in the provision of a refractor element, herein shown without limitation as a translucent glass sphere or ball 25. The degree of light transmission and the degree of refraction by the ball 25 may vary from transparency, to a condition somewhat short of opacity. It is a preference so to locate the sphere or ball 25 inward of one end of the tube, and while it will function in the manner described, in any of a variety of positions axially of the tube, the effect is enhanced when it is located somewhat nearer the eyepiece end, as shown. For ease of manipulation when the refractor be employed, this element, which is in the form of a glass marble, is positioned in bridging relation to a plurality of apertures such as 26 in the strip 10, 27 in the strip 11 and 28 in strip 12. Due to the spherical surface of the refractor, it will project through the apertures, the sizes of which are appropriately selected for this purpose; thus as will appear from Figs. 1, 2 and 3, a surface portion of the refractor will always be presented exteriorly of each of the planar sides of the tube, as indicated at 30.

The use of the device embodying the refractor is quite similar to that described above, in that, according to the nature of the target material and the kind and angle of illumination thereof, the tube is disposed with its end 16 at an angle which may be readily determined to give the maximum light through the tube. The end 16 will usually be held one or two inches above the target, image or subject, and once the optimum angle is determined, an array of colors, assuming a colored target, will appear by observation through the eyepiece opening 21. Rotation of the sphere 25 may be made in any direction, since it is susceptible of universal movement and the rotation will provide a quasi-kaleidoscopic effect which may be infinitely varied through selection of subject matter of differing patterns and colors.

It will now have become apparent that the tube may be formed of a variety of materials, and may in fact be constructed of selected lengths of preformed tubing. The number of planar reflecting surfaces may also be varied considerably within moderate limits of three or more, say to six or eight, within the principles of construction hereinabove disclosed.

Although the invention has been described by making detailed reference to a single presently preferred embodiment, the detail of description is to be understood solely in an instructive sense, inasmuch as numerous variants are possible within the full intended scope of the claims hereunto appended.

I claim as my invention:

1. A device for producing multiple reflective images, and consisting of a tubular structure having openings at its opposite ends, the tubular structure being formed to provide a plurality of highly reflective planar surfaces interiorly of the tubular structure, and a movable refractor of spherical form bridging certain of the walls of the tubular structure although axially positioned therein and capable of rotative movement within and with respect to the tube for the purpose of varying the nature and relation of images reflected by said reflective surfaces.

2. In an optical device for producing multiple reflected images, a tube formed of three angularly related reflecting strips, the tube having end openings, a spherical, translucent refractor disposed between the ends of the tube, the three strip elements each being apertured to permit the spherical refractor to bridge and extend through the strips, and the diameter of the spherical element being such that it extends through the several said openings therefor in a position to be manually manipulated externally of the tube, whereby to produce optical variants of the images reflected internally of the tube by the surfaces of the strips and beyond the refractor.

FRANK EARL FLOTRON.

REFERENCES CITED

The following references are of record in the file of this patent:

UNITED STATES PATENTS

| Number | Name | Date |
| --- | --- | --- |
| 143,271 | Bush | Sept. 30, 1873 |
| 984,198 | Dougall | Feb. 14, 1911 |
| 1,010,808 | Scheufler | Dec. 5, 1911 |
| 1,290,078 | Cappa | Jan. 7, 1919 |
| 1,294,967 | Stabla | Feb. 18, 1919 |
| 1,383,019 | Petrie | June 28, 1921 |
| 2,066,548 | Thompson | Jan. 5, 1937 |
| 2,152,424 | Wetmore | Mar. 28, 1939 |